UNITED STATES PATENT OFFICE.

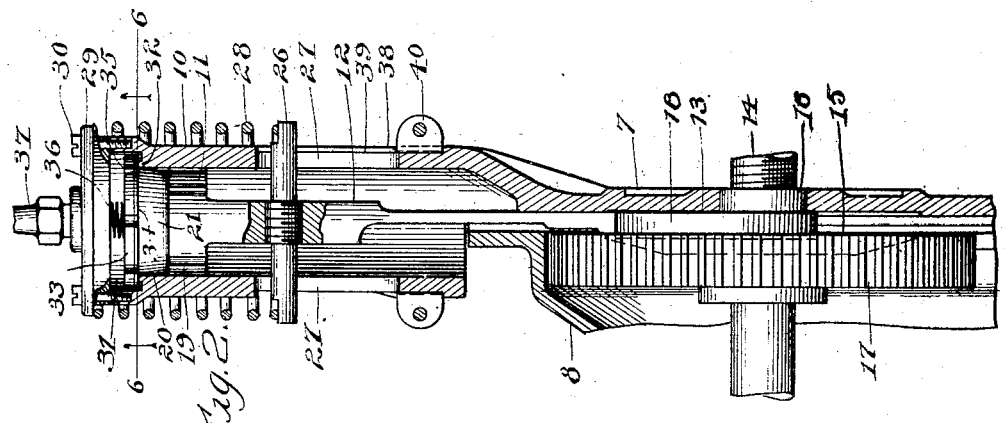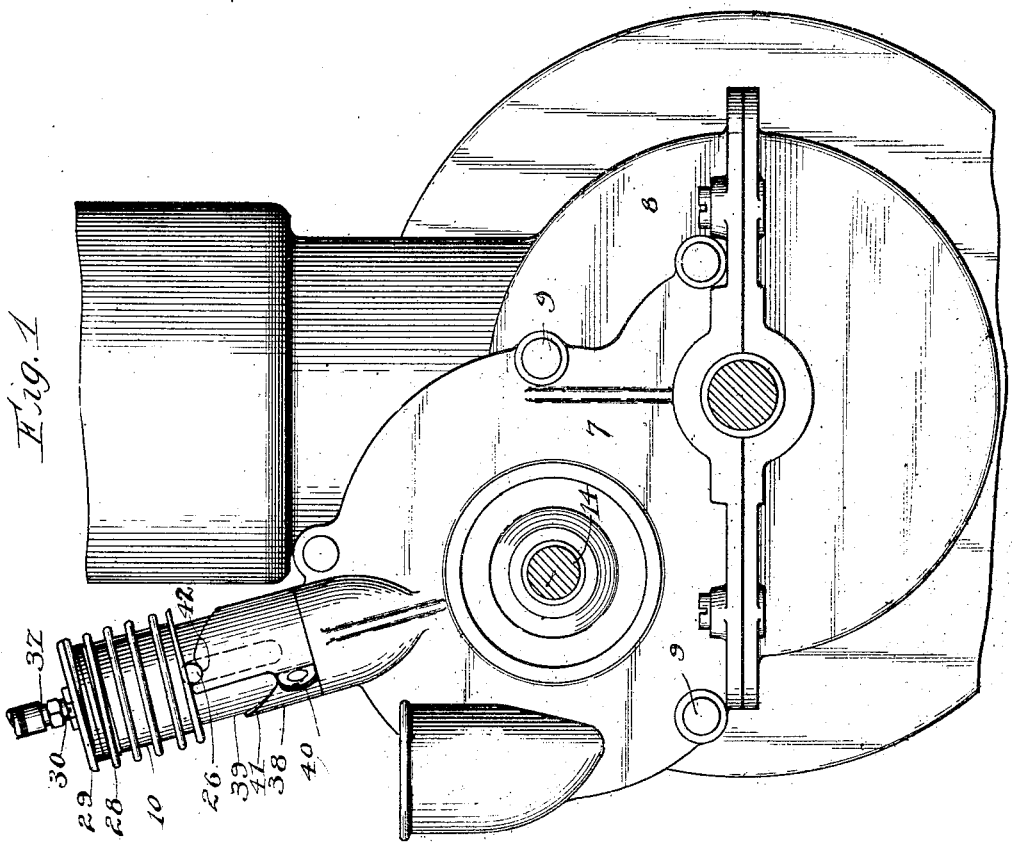

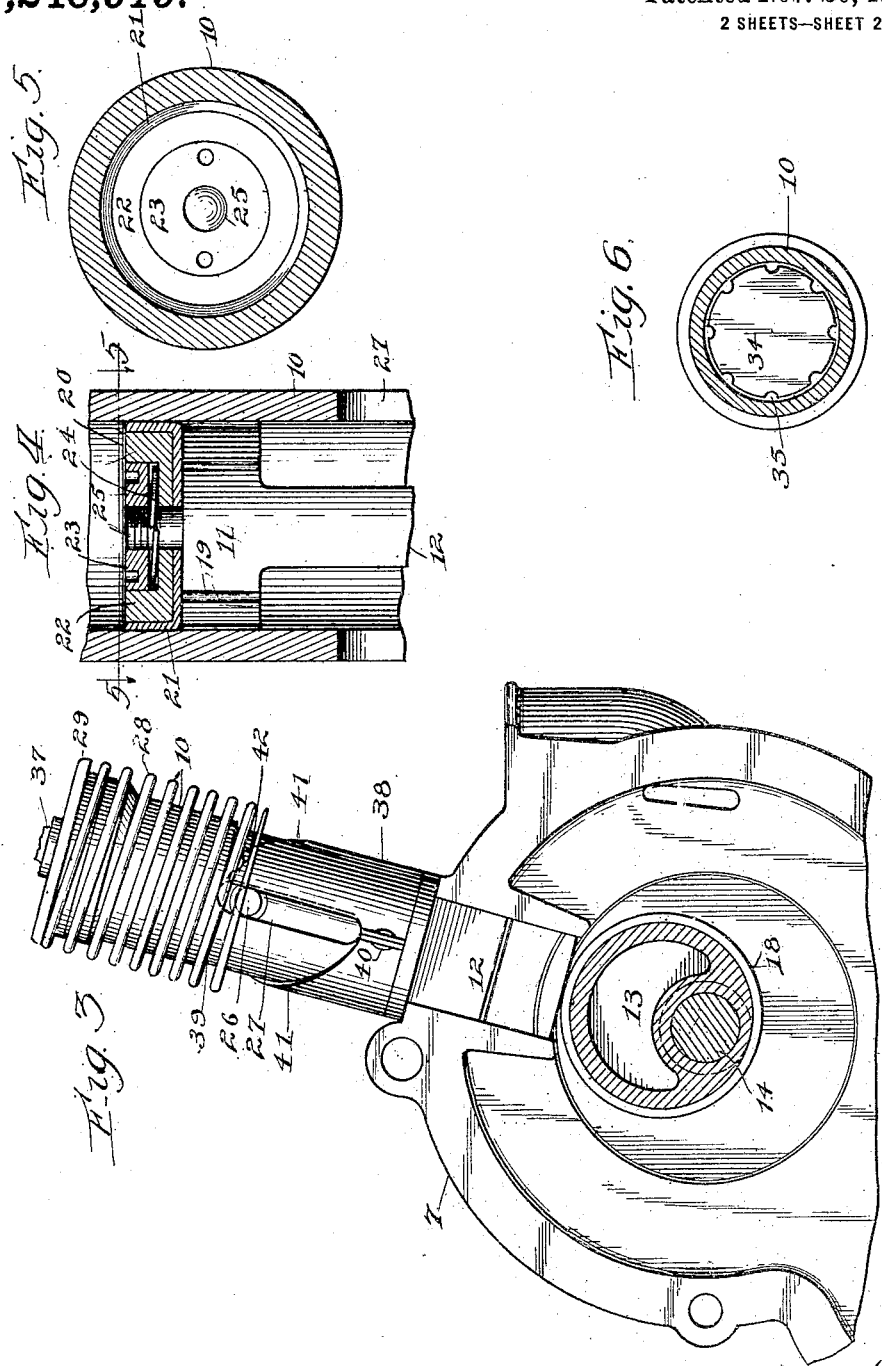

PAUL S. HERRING, OF CHICAGO, ILLINOIS.

AUTOMOBILE-PUMP.

1,246,919.  Specification of Letters Patent.  Patented Nov. 20, 1917.

Application filed February 7, 1916. Serial No. 76,508.

*To all whom it may concern:*

Be it known that I, PAUL S. HERRING, a citizen of the United States, residing at Chicago, in the county of Cook and State of Illinois, have invented certain new and useful Improvements in Automobile-Pumps, of which the following is a specification.

This invention relates more particularly to an air pump which is adapted to be used in connection with or as a part of an automobile engine, and to be driven thereby.

Among the objects of this invention are to provide an arrangement or construction whereby the air pump will be attached to or built into the engine in a simple and convenient manner, so as to occupy but little space; to provide such an arrangement in which the principal driving parts will be lubricated from the lubricating system of the engine; to provide a novel form of pump which can be made at an exceedingly low cost, and which will be efficient in operation and may be readily driven from the cam shaft of the engine; and in general, to provide such advantages and improvements in construction as will appear more fully hereinafter.

In the accompanying drawings illustrating this invention:

Figure 1 is an end view of an engine, showing my improved pump applied thereto;

Fig. 2 is a longitudinal sectional view of a pump and driving mechanism;

Fig. 3 is a rear view of the pump shown removed from the engine;

Fig. 4 is a longitudinal sectional detail of the pump piston valve;

Fig. 5 is a cross sectional view taken on the line 5—5 of Fig. 4; and

Fig. 6 is a cross sectional view taken on the line 6—6 of Fig. 2.

While my improved pump is adapted to be applied to automobiles of various makes or designs, the drawings illustrate the same as applied to the Ford engine. In this instance the regular cover plate for the timing gears is removed and I provide a special plate 7, which is bolted to the main engine casing 8 by means of the bolts or screws 9. The pump cylinder 10 is preferably cast integrally with the plate 7. A piston 11 fits within the cylinder 10, and is provided with a piston rod 12, which extends down between the plate 7 and casing 8, as readily seen from Figs. 2 and 3. The piston rod 12 is adapted to engage with a cam 13, which is secured to the cam shaft 14. In this particular instance the cam 13 is formed integrally with a plate or disk 15, and has a threaded hub 16, which screws onto the shaft 14. The disk 15 engages with the timing gear 17, and serves to hold the same in position, thereby taking the place of the ordinary nut used for this purpose. The cam 13 is preferably provided with a wearing ring 18, which engages directly with the end of the rod 12, and serves to take the wear between these parts.

The piston 11 fits within the cylinder 10 to form a guide, but is provided with peripheral grooves 19, to allow the air to pass beyond the same to the valve 20. This valve comprises a leather cup 21, which is held by means of a disk 22, which disk is locked in position by a lock nut 23 and lock washer 24. The nut 23 engages with a threaded stem, the bolt 25 extending upwardly from the piston 11. A cross rod or guide rod 26 is threaded to engage with a threaded hole through the piston rod 12, and its ends extend out through slots 27 in the sides of the cylinder 10. A compression spring 28 engages with the rod 26 and the cylinder head 29, which serves as the upper abutment for the spring. The head is held in position by means of screws 30, or in any other suitable manner. The upper end of the cylinder 10 is enlarged to form a chamber 31, this chamber having a valve seat 32 in the bottom thereof, for the valve 33. The latter comprises a flat metallic disk, with a facing of leather or other suitable fabric, which is adapted to make a flat closure on the seat 32. The valve is provided with grooves 35 around the circumference thereof, so as to permit the air to pass easily around the same. The valve 33 is preferably held against its seat by means of a spring 36, which is interposed between the valve and the cylinder head 29. The head is provided with an outlet nipple or pipe 37, to which hose may be applied for conducting the air to the tires, or connections may be applied for using the air in any way desired.

A rotatable sleeve 38 fits within the circumferential recess 39 around the lower end of the cylinder 10, and is provided with projecting ears 40, whereby it may be readily turned. The upper end of this sleeve is made in the form of two semicircular cams 41, which are adapted to engage with the ends of the guide rod 26, and notches 42 are provided at the upper ends of these cams, so that when the ends of the rod engage with these notches, the sleeve will serve to hold the rod and connected parts in raised position, as shown in Fig. 1.

When the parts have been assembled in the manner indicated, the cam 13 and lower end of the rod 12 will be oiled from the oil which is supplied to the timing gears, so that these parts will be thoroughly lubricated. When the operator desires to use the pump, the sleeve 38 is rotated to the left, which permits the guide rod 26 to move down under the influence of the spring 28, until the piston rod 12 engages with the cam. The piston is then reciprocated through the action of the cam and the spring. As it moves down, air will pass the valve 20 into the space above the piston, and then as the piston is raised, this air will be forced up beyond the valve 33 and out through the outlet 37. On account of the large size of the valve 33, the air will pass freely around the same, and if any oil becomes mixed therewith, it will not be apt to be carried beyond the chamber 31, as it will have a chance to settle in this chamber. The parts are so arranged that the valve 20 may come close up to the valve 33 on each upward stroke of the piston, or may even raise the valve 33 slightly, which will insure all of the compressed air being forced out of the cylinder, thereby effecting an efficient and rapid pumping action. The openings through the cylinder and the coiled spring surrounding the same will tend to cool the pump, this spring serving to conduct the heat away, as well as serving to agitate the air around the cylinder.

While the drawings show the construction for a particular form of engine, it is readily understood that my improved pump may be applied to various types of engines, and it will also be understood that the parts may be changed or modified in construction without departing from the scope of this invention.

What I claim and desire to secure by Letters Patent is:

1. The combination with an internal combustion engine, of a casing member adapted to form part of the engine casing, a cylinder for an air pump formed integrally with said member, a piston for said cylinder, and actuating means for said piston, said actuating means co-acting with driving devices arranged within the casing, and driven by the engine, the arrangement being such that said driving devices will be lubricated by the engine oil.

2. A gasolene engine having a plate adapted to cover the timing gear, and forming a part of the engine base, a cylinder for an air pump, connected with said plate, a piston for said cylinder, and means connecting with the cam shaft of the engine, for driving said piston.

3. The combination with a gasolene engine, of a plate for covering the timing gears, and forming a part of the engine casing, a cylinder for an air pump connected with said plate, a piston for said cylinder, a piston rod extending from said piston into the engine casing, a guideway in said plate for said rod, a cam mounted on the cam shaft of the engine and adapted to engage with said rod to raise the piston, and a spring co-acting with said piston to depress the same.

4. The combination with a rotatable member of an internal combustion engine, of a cam located within the engine casing, and adapted to be lubricated by the engine oil, a plate for covering the timing gears, and forming a part of the engine casing, an air pump connected with said plate, and means driven by said cam for actuating said pump.

5. The combination with the plate covering the timing gear of a gasolene engine, of a cylinder for an air pump, a valve piston for said pump, a cam mounted on the cam shaft of the engine within the casing, means co-acting with said cam for raising the piston, a spring co-acting with said piston to move it in the opposite direction, and means for locking said piston in raised position.

PAUL S. HERRING.